(12) United States Patent
Putzig

(10) Patent No.: US 7,795,189 B2
(45) Date of Patent: Sep. 14, 2010

(54) ZIRCONIUM-HYDROXY ALKYLATED AMINE-HYDROXY CARBOXYLIC ACID CROSS-LINKING COMPOSITION FOR USE WITH HIGH PH POLYMER SOLUTIONS

(75) Inventor: Donald Edward Putzig, Newark, DE (US)

(73) Assignee: E.I. du Pont de Nemours and Company

( * ) Notice: Subject to any disclaimer, the term of this patent is extended or adjusted under 35 U.S.C. 154(b) by 161 days.

(21) Appl. No.: 12/005,692

(22) Filed: Dec. 28, 2007

(65) Prior Publication Data

US 2009/0166041 A1    Jul. 2, 2009

(51) Int. Cl.
*C01G 25/00* (2006.01)
*C07C 59/08* (2006.01)
*C09K 8/60* (2006.01)

(52) U.S. Cl. .......................... 507/271; 423/69; 423/81; 423/708; 507/239; 507/267; 562/589

(58) Field of Classification Search .................. 507/271, 507/239, 267; 423/69, 81, 708; 562/589
See application file for complete search history.

(56) References Cited

U.S. PATENT DOCUMENTS

| | | | |
|---|---|---|---|
| 4,460,751 A | 7/1984 | Hanlon et al. | |
| 4,578,488 A | 3/1986 | Rummo et al. | |
| 4,683,068 A | 7/1987 | Kucera | |
| 4,686,052 A | 8/1987 | Baranet et al. | |
| 4,883,605 A | 11/1989 | Putzig | |
| 5,182,408 A | 1/1993 | Sharif | |
| 5,216,732 A | 6/1993 | Knott | |
| 5,217,632 A | 6/1993 | Sharif | |
| 5,466,846 A | 11/1995 | Sharif | |
| 5,478,802 A | 12/1995 | Moradi-Araghi | |
| 5,642,783 A | 7/1997 | Moradi-Araghi et al. | |
| 5,789,351 A | 8/1998 | Ahmed et al. | |
| 5,798,320 A | 8/1998 | Dawson et al. | |
| 5,981,447 A | 11/1999 | Chang et al. | |
| 6,017,855 A | 1/2000 | Dawson et al. | |
| 6,383,999 B1 | 5/2002 | Coyle et al. | |
| 6,793,018 B2 | 9/2004 | Dawson et al. | |
| 2001/0007850 A1 | 7/2001 | Dawson et al. | |
| 2004/0152602 A1 | 8/2004 | Boles | |
| 2006/0046938 A1 | 3/2006 | Harris et al. | |
| 2006/0058197 A1 | 3/2006 | Brown et al. | |
| 2006/0247135 A1 | 11/2006 | Welton et al. | |
| 2009/0159280 A1* | 6/2009 | Putzig et al. ............. | 166/280.2 |

FOREIGN PATENT DOCUMENTS

| | | |
|---|---|---|
| EP | 557146 | 8/1993 |
| EP | 0 604 988 B1 | 9/1999 |
| FR | 1353086 | 2/1964 |
| FR | 2686891 A1 | 6/1993 |
| GB | 2 341 625 A | 3/2000 |
| JP | 40007484 | 2/1962 |

OTHER PUBLICATIONS

U.S. Appl. No. 11/643,513, filed Dec. 21, 2006, Putzig.
Intorre et al., Aqueous Zirconium Complexes. II. Mixed Chelates; J. of the American Chemical Society (1961), 83, 3618-3623.
Ptitsyn et al., Determining the relative stability of complex compounds; Izv. Sibirsk. Otd., Akad. Nauk SSSR, Ser. Khim. Nauk (1963), (1), 3-8. Inst. Inorg. Chem., Novosibirsk. Abstract.
Ryabchikov et al., Stability of some inorganic and organic complex compounds of zirconium and hafnium; J. of Inorganic and Nuclear Chemistry (1964), 26(6), 965-980. Pergamon Press Ltd.

* cited by examiner

*Primary Examiner*—Timothy J. Kugel
(74) *Attorney, Agent, or Firm*—Kathryn M. Sanchez

(57) ABSTRACT

A process to prepare a solution of zirconium-hydroxyalkylated diamine-lactic acid complex is disclosed and use of the solution in oil field applications such as hydraulic fracturing and plugging of permeable zones. The process comprises contacting an alcohol solution of a zirconium complex with an hydroxyalkylated diamine, then with lactic acid to produce a solution of zirconium-hydroxyalkylated diamine-lactic acid complex. The solution is particularly suitable for use in a cross-linking composition in hydraulic fracturing and plugging of permeable zones of subterranean formations at pH of 10 or greater and at temperatures of 275° F. (135° C.) and higher in the formation.

24 Claims, No Drawings

ZIRCONIUM-HYDROXY ALKYLATED AMINE-HYDROXY CARBOXYLIC ACID CROSS-LINKING COMPOSITION FOR USE WITH HIGH PH POLYMER SOLUTIONS

FIELD OF THE INVENTION

The present invention relates to zirconium chelates and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linking agent into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity. Frequently the rates of cross-linking with known cross-linking compositions are unacceptable, and new, highly specific compositions are required.

Commercially available zirconate cross-linkers, such as tetra-triethanolamine zirconate cross-link too fast under high pH (pH 10) conditions, causing a significant loss in viscosity due to shear degradation. Other zirconium complexes of triethanolamine, such as those disclosed in U.S. Pat. Nos. 4,578,488, 4,683,068, and 4,686,052 can be used as cross-linking agents. However, these complexes also do not cross-link at a desirable rate, especially in high pH conditions, causing a similar loss in viscosity due to shear degradation.

Zirconium complexes of triethanolamine and an α-hydroxycarboxylic acid are also known. See, for example. U.S. Pat. Nos. 4,460,751 and 5,182,408. While the addition of lactic acid to tetra-triethanolamine zirconate slows down the rate of cross-linking, viscosity generation and retention are sacrificed.

Zirconium complexes of hydroxyalkylene diamines are known. See, for example, U.S. Pat. No. 4,883,605 and copending U.S. patent application Ser. No. 11/643,513, filed Dec. 21, 2006. However, for high pH conditions, such as pH 10, these complexes are unsuitable. The complexes disclosed in U.S. Pat. No. 4,883,605 cross-link too slowly (>10 minutes), causing a "sand out" to occur, which is the result of sand depositing at the bottom of the wellbore due to lack of viscosity development before the gel reaches the fracture zone. The complexes disclosed in U.S. patent application Ser. No. 11/643,513 cross-link in the desirable range of 3-8 minutes; however they have storage stability problems resulting in uneven performance, such as increasing cross-link times after storage and reduction in viscosity generating potential.

There is a need for compositions which cross-link at a 5-7 minute rate, intermediate between zirconium complexes of hydroxyethyl tris-hydroxyisopropyl ethylenediamine and tri-ethanolamine zirconates, which composition can be used successfully in high pH (about pH 10 and above) conditions. This invention meets these needs.

SUMMARY OF THE INVENTION

The present invention provides a solution of a zirconium complex comprising the reaction product of a tetraalkyl zirconate in an alcohol, 0.5 to 1.5 moles of a hydroxyalkylated ethylenediamine per mole of zirconium, and 1 to 3 moles of lactic acid per mole of zirconium, wherein the alcohol has 1 to 6 carbon atoms.

The present invention further provides a process for preparing a solution of a zirconium complex suitable for use as a cross-linking agent in a fracturing fluid composition comprising: contacting a solution of a tetraalkyl zirconate in an alcohol with from 0.5 to 1.5 moles molar equivalents of a hydroxyalkylated ethylenediamine per mole of zirconium and from 1 to about 3 moles of lactic acid per mole of zirconium, wherein the alcohol has 1 to 6 carbon atoms. The process can be performed at a variety of temperatures, preferably from about 25° C. to about 90° C., more preferably between 50° C. and 80° C.

The present invention further provides a cross-linking composition comprising a solution of a zirconium complex prepared according to the process of this invention and methods to use the composition as a fracturing fluid.

DETAILED DESCRIPTION OF THE INVENTION

Trademarks and Tradenames are shown herein in upper case.

This invention provides a solution of an effective cross-linking agent or cross-linker for use in cross-linking compositions for oil field applications, by adding lactic acid to hydroxyalkylated ethylenediamine complexes of zirconium. Although prior art discloses that lactic acid is effective in slowing down the rate of cross-linking for triethanolamine zirconate complexes, lactic acid surprisingly increases the rate of cross-linking for hydroxyalkylated ethylenediamine zirconate complexes, providing cross-linkers which have a desirable 5-7 minute rate of cross-linking for use in hotter, deeper wells. The viscosity generating capability of these complexes is similar to the hydroxyalkylated ethylenediamine zirconate starting material.

The zirconium-hydroxyalkylated diamine-lactic acid cross-linkers of the invention can be used in a high pH environment to give thermally stable, high viscosity fluids.

The present invention provides a solution of a zirconium complex comprising the reaction product of a tetraalkyl zirconate in an alcohol, 0.5 to 1.5 moles of a hydroxyalkylated ethylenediamine per mole of zirconium, and 1 to 3 moles of lactic acid per mole of zirconium, wherein the alcohol has 1 to 6 carbon atoms. The tetraalkyl zirconate is preferably selected from the group consisting of tetra-isopropyl zirconate, tetra-n-propyl zirconate, and tetra-n-butyl zirconate. The hydroxyalkylated ethylenediamine is preferably selected from the group consisting of tetrahydroxyisopropyl ethylenediamine, hydroxyethyl tris-hydroxyisopropyl ethylenediamine, tetrahydroxyethyl ethylenediamine, and mixtures thereof. The alcohol is preferably methanol, isopropanol, or n-propanol.

The present invention further provides a process to prepare a solution of a zirconium complex, which is suitable for use in a cross-linking composition used as a fracturing fluid, which comprises contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms. Preferably the ratio of hydroxyalkylated ethylenediamine to zirconium is from 1 to 1.5 moles hydroxyalkylated ethylenediamine per mole of zirconium. Preferably the mole ratio of lactic acid to zirconium is from 1.5 to 3 moles of lactic acid per mole of zirconium. Higher amounts of lactic acid may cause gelling.

The process of this invention is performed in an alcohol solvent. The solvent is typically an alcohol having 1 to 6 carbon atoms. Typically the solvent is methanol, isopropanol, or n-propanol. Preferably the alcohol is methanol.

A number of tetraalkyl zirconates (also known as zirconium tetraalkoxides) can be used to prepare the zirconium complex solution of this invention, e.g., tetra-i-propyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol, with a zirconium content as $ZrO_2$ of about 28% by weight, available from E. I. du Pont de Nemours and Company, Wilmington, Del.

Preferably the hydroxyalkylated diamine is tetrahydroxyisopropyl ethylenediamine, hydroxyethyl tris-hydroxyisopropyl ethylenediamine, tetrahydroxyethyl ethylenediamine, or mixtures thereof. More preferably it is tetrahydroxyisopropyl ethylenediamine, which is available as QUADROL polyol from BASF Corporation, Mount Olive, N.J.

Contacting a tetraalkyl zirconates with the ethylenediamine derivative and lactic acid can be carried out at a variety of temperatures, e.g., between 25° C. and 90° C., preferably between 50° C. and 80° C., and in any order. The contacting time should be sufficient to stabilize the resulting solution. A contact time of about 2 hours at 60° C. is adequate, but other periods may be used.

Preferably the reaction is performed under substantially non-aqueous conditions, that is, without the addition of water. This is surprising in view of copending U.S. patent application Ser. No. 11/643,513, which discloses preparation of solutions of zirconium-hydroxyalkylated ethylenediamine, and wherein the addition of water was necessary to obtain a clear solution of the zirconium-hydroxyalkylated ethylenediamine composition. Thus, it is found herein that addition of lactic acid renders addition of water unnecessary. For some solutions prepared according to the process of this invention, addition of water can be harmful to the extended viscosity of the cross-linked product. The zirconium complex solution prepared herein is stable, that is, does not form precipitates or lose activity for cross-linking upon storage for at least 6 months.

The present invention also provides a cross-linking composition which comprises (A) an aqueous liquid; (B) a pH buffer; (C) a cross-linkable organic polymer; and (D) a solution comprising a zirconium complex prepared by a process comprising contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms.

The aqueous liquid (A) is typically selected from the group consisting of water, aqueous alcohol, and aqueous solution of a clay stabilizer. The alcohol can be the same or different alcohol as the reaction solvent, that is, an alcohol having 1 to 6 carbon atoms. Preferably, when the aqueous liquid is aqueous alcohol, the alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Preferably, when the aqueous liquid is an aqueous solution of a clay stabilizer, the clay stabilizer is tetramethylammonium chloride or potassium chloride.

The aqueous liquid can also be a mixture of water and one or more organic solvents. Organic solvents that may be used include alcohols, glycols, polyols, and hydrocarbons such as diesel.

Preferably, the aqueous liquid is water, aqueous methanol, aqueous ethanol, an aqueous solution of potassium chloride, an aqueous solution of tetramethylammonium chloride, or a combination of two or more thereof.

The cross-linking composition comprises an effective amount of a pH buffer (B) to control pH. The pH buffer may be acidic, neutral or basic. The pH buffer is generally capable of controlling the pH from about pH 5 to about pH 12. For example in a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. The cross-linking composition solution of this invention advantageously comprises a ph buffer for pH 9-12. Other suitable pH buffers can be used, as are known to those skilled in the art.

The composition further comprises a cross-linkable organic polymer (C). Suitable cross-linkable organic polymers are selected from the group consisting of solvatable polysaccharides, polyacrylamides and polymethacrylamides. Preferably the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Preferred gum derivatives include hydroxyethyl guar (HEG), hydroxypropyl guar (HPG), carboxyethylhydroxyethyl guar (CEHEG), carboxymethylhydroxypropyl guar (CMHPG), and carboxymethyl guar (CMG). Preferred cellulose derivatives include those containing carboxyl groups, such as carboxymethylcellulose (CMC) and carboxymethylhydroxyethylcellulose (CMHEC). The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation. The cross-linkable polymer is normally mixed with the aqueous liquid to form a base gel.

The solution of zirconium complex (D) is the alcohol solution of zirconium complex prepared by contacting a tetraalkyl zirconate with hydroxyalkylated ethylenediamine and lactic acid as described previously. Optionally this may contain an added solvent, wherein the solvent is an alcohol having 1 to 6 carbon atoms.

The cross-linking composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired cross-linking time, temperature and other conditions present in the formation being fractured or permeable zone being plugged.

The cross-linking composition is produced by mixing the solution of zirconium complex with the other components, in any order. For example, in one particular application in an oil field, the solution of zirconium complex and optional components are introduced into a formation, while the cross-linkable organic polymer and aqueous liquid are introduced into the formation as a separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention provides a method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer, a solution of a zirconium solution prepared by contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms. Preferably, there is a mole ratio of 1 to 1.5 moles hydroxyalkylated ethylenediamine per mole of zirconium. Preferably, there is a mole ratio of 1.5 to 3 moles of lactic acid per mole of zirconium.

In one embodiment of the method for hydraulically fracturing a subterranean formation, the solution of zirconium-hydroxyalkylated diamine-lactic acid complex and a base gel are contacted prior to their introduction into the formation, such that the cross-linking agent and polymer react to form a cross-linked gel. The cross-linked gel is then introduced into the formation at a flow rate and pressure sufficient to create, reopen, and/or extend a fracture in the formation. In this method, a base gel is prepared by mixing a cross-linkable organic polymer with an aqueous liquid. The cross-linked gel is prepared by mixing the base gel with a solution of a zirconium cross-linking agent prepared by a process comprising contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms, at a temperature of 50° C. to 90° C. for a period of time sufficient to stabilize the resulting solution of the complex. Optionally, one or more solvents can be added in preparing the cross-linked gel. At least one of the solutions of zirconium complex and the base gel further comprise a pH buffer.

Alternatively, the subterranean formation may be penetrated by a wellbore, such that contacting the solution of zirconium complex with the base gel occurs in the wellbore and the cross-linked gel is introduced into the formation from the wellbore. This method of hydraulically fracturing a subterranean formation penetrated by a wellbore comprises (a) preparing a base gel by mixing a cross-linkable organic polymer with an aqueous liquid; (b) introducing the base gel into the wellbore; (c) simultaneously with, or sequentially after, introducing the base gel into the wellbore, introducing a solution comprising a zirconium complex prepared by a process comprising contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms; (d) permitting the base gel and the solution of zirconium complex to react to form a cross-linked aqueous gel; and (e) introducing the cross-linked gel into the formation from the wellbore at a flow rate and pressure sufficient to create, reopen, and/or extend a fracture in the formation. A pH buffer is independently admixed with the base gel, the solution of zirconium complex or both prior to introducing the base gel and the zirconium solution into the wellbore.

Upon creation of a fracture or fractures, the method may further comprise introducing a cross-linking composition comprising the solution of zirconium complex, a cross-linkable organic polymer and proppant into the fracture or fractures. This second introduction of a solution of zirconium complex is preferably performed in the event the cross-linking composition used to create the fracture or fractures did not comprise proppant.

Another use for the solution of zirconium complex of the present invention relates to a method for selectively plugging permeable zones and leaks in subterranean formations which comprises introducing into the permeable zone or the site of the subterranean leak, a cross-linking composition comprising (A) an aqueous liquid; (B) a pH buffer; (C) a cross-linkable organic polymer; and (D) a solution comprising a zirconium complex prepared by a process comprising contacting a solution of a tetraalkyl zirconate in an alcohol with from 0.5 to 1.5 moles molar equivalents of hydroxyalkylated ethylenediamine per mole of zirconium and from 1 to about 3 moles of lactic acid per mole of zirconium, wherein the alcohol has 1 to 6 carbon atoms; into the permeable zone or the site of the subterranean leak. The pH buffer may be admixed with the solution of zirconium complex prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the solution of zirconium complex are contacted prior to their introduction into the subterranean formation, such that the polymer and zirconium complex react to form a cross-linked aqueous gel, which gel is then introduced into the formation.

In an alternative embodiment of the method for plugging a permeable zone or a leak in a subterranean formation, the solution of zirconium complex and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with, or sequentially after, introducing the base gel into the into the permeable zone or the site of the subterranean leak, introducing the solution of zirconium complex into the into the permeable zone or the site of the subterranean leak; (e) permitting the base gel and the cross-linking agent to react to form a cross-linked aqueous gel to plug the zone and/or leak. The solution of zirconium complex, the base gel, or both further comprise a pH buffer.

The relative amounts of cross-linkable organic polymer and the zirconium complex may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the zirconium complex, with percentages being based on the total weight of the base gel. Preferably, from about 0.25 to about 0.75 weight % of the cross-linkable organic polymer is used and from about 0.05 to about 0.25 weight % of the zirconium complex is used.

In a method for plugging permeable zones or leaks, generally about 0.25 to 1.2 weight % of a cross-linkable organic polymer is used, preferably 0.40 to 0.75 weight %, based on the total weight of the base gel. Generally about 0.01 to 0.50 weight % of the zirconium complex is used, preferably 0.05 to 0.25 weight %, based on the total weight.

The amount of zirconium complex used to cross-link the organic polymer is that which provides a zirconium ion concentration in a range from about 0.0005 weight % to about 0.1 weight %, based on the total weight of the base gel. The preferred concentration of zirconium ion is in the range of from about 0.001-0.05 weight %, based on the total weight.

Typically the solution of zirconium complex of this invention can be used at a pH of from about 3 to 11. For low temperature applications (150-250° F., 66-121° C.), carbon dioxide-based energized fluids may be used. In this case, a pH for the cross-linking composition of about 3 to about 6 is preferred. For moderate or high temperature applications (275-400° F., 121-204° C.), a pH of about 9 to about 11 is preferred. Advantageously, the solution of zirconium complex of this invention is used at a temperature of 275-325° F. (135-163° C.) and at a pH 10 or greater. For successful completion of the fracturing operation at a temperature of 250° F. (121° C.), whether hydraulic fracturing or plugging a permeable zone, the cross-linking composition should provide a viscosity of at least 100 Cp, preferably at least 200 Cp, 90 minutes after introducing the cross-linking composition into the subterranean formation or permeable zone or site of a subterranean leak.

EXAMPLES

The preparation of the compositions in the Comparative Examples and in the Examples of the invention were each carried out in closed vessels containing an agitator, thermometer, condenser, nitrogen inlet and dropping funnel. Unless specified otherwise, percentages are given by weight. Temperatures are given in degrees Celsius. The cross-linking properties of the compositions prepared in Comparative Examples and in the Examples of the invention are given as a function of the viscosity of carboxymethylhydroxypropyl guar cross-linked with the compositions.

Comparative Example A

Triethanolamine (135.2 g) was added to 100 g of tetra-n-propyl zirconate solution (TYZOR NPZ organic zirconate, available from E. I. du Pont de Nemours and Company, Wilmington, Del.). The reaction mixture was heated to 60° C. and held at this temperature for 4 hours to complete the reaction. Upon completion of the reaction, the resulting solution of tetra(triethanolamine) zirconate was concentrated on a rotary evaporator under reduced pressure to yield 155 g of a viscous yellow oil, which contained 13.2% Zr.

Comparative Example B

Hydroxyethyl trishydroxyisopropyl ethylenediamine (146 g) was added to 220.3 g of tetra-n-propyl zirconate. The reaction mixture was heated to 60° C. and held at this temperature for 4 hours to complete the reaction and to give 346 g of a pale yellow liquid containing hydroxyethyl trishydroxyisopropyl ethylenediamine zirconate, containing 12.4% Zr.

Comparative Example C

A 500-mL flask, equipped with a thermocouple, dropping funnel, N2 bleed and condenser was charged with 59.8 g of 85% lactic acid. Agitation was started and 61.6 g of triethanolamine and 50 g of water were added. The solution was cooled to 15° C. and then 122.5 g of 30% zirconium oxychloride solution were added. The pH was adjusted to 8.0 using 21.7 g of 28% ammonium hydroxide solution. The solution was diluted with 180 g of water to give 495 g of a water white solution containing 3.8% of Zr.

Comparative Example D

A 500 mL-flask, equipped with a thermocouple, dropping funnel, N2 bleed and condenser was charged with 100 g of TYZOR NPZ organic zirconate. Agitation was started and 133.5 g of triethanolamine were added. The solution was heated to 60° C. and held at this temperature for 2 hours. Then, 69.6 g of 85% lactic acid were added. The solution was heated at 60° C. for an additional 2 hours to give 304 g of an orange liquid containing 6.8% of Zr.

Example 1

A 500-mL flask, equipped with a thermocouple, dropping funnel, N2 bleed and condenser was charged with 100 g of TYZOR NPZ organic zirconate. Agitation was started and 66.3 g of QUADROL polyol were added. The solution was heated to 60° C. and held at this temperature for 2 hours. Then, 69.6 g of 85% lactic acid were added and the solution held an additional 2 hours at 60° C. to give 235 g of an orange liquid containing 8.8% of Zr.

Example 2

A 500-mL flask, equipped with a thermocouple, dropping funnel, N2 bleed and condenser was charged with 100 g of TYZOR NPZ organic zirconate. Agitation was started and 99.5 g of QUADROL polyol were added. The solution was heated to 60° C. and held at this temperature for 2 hours. Then, 34.8 g of 85% lactic acid were added and the solution held an additional 2 hours at 60° C. to give 232 g of an orange liquid containing 8.8% of Zr.

Example 3

A 500-mL flask, equipped with a thermocouple, dropping funnel, N2 bleed and condenser was charged with 100 g of TYZOR NPZ organic zirconate. Agitation was started and 63.1 g of hydroxyethyl tris-hydroxyisopropyl ethylenediamine (L-699 amine) were added. The solution was heated to 60° C. and held at this temperature for 2 hours. Then, 69.6 g of 85% lactic acid were added and the solution held at 60° C. for an additional 2 hours, to give 232 g of an orange liquid containing 8.9% of Zr.

Example 4

A 500-mL flask, equipped with a thermocouple, dropping funnel, N2 bleed and condenser was charged with 100 g of TYZOR NPZ organic zirconate. Agitation was started and 59.9 g of tetrahydroxyethyl ethylenediamine (THEED) were added. The solution was heated to 60° C. and held at this temperature for 2 hours. Then, 69.6 g of 85% lactic acid were added and the solution held at 60° C. for an additional 2 hours, to give 229 g of an orange liquid containing 9% of Zr.

Preparation of Base Gel

A Waring blender jar was filled with 1 liter of distilled water. To this was added 2 g of a 50% aqueous solution of tetramethylammonium chloride clay stabilizer. Agitation was started and 3.6 g of carboxymethylhydroxypropyl guar (CM-HPG) was sprinkled into the vortex of the agitating solution. The pH of the resultant slurry was adjusted to 6 with sodium diacetate and agitation continued for 30 minutes. The pH was then adjusted to 10.3 with 10% sodium hydroxide solution. Agitation was stopped and the gel was allowed to stand for 30 minutes or more before use.

Viscosity Measurement of Zirconate Cross-Linked Base Gel

To 250 ml of a vigorously agitated sample of base gel in a Waring blender jar, was added 0.00032 moles of zirconium (0.2-1.0 ml dependent on percent zirconium of cross-linker solution—hereinafter referred to as the Standard Loading Density) for each of the Comparative Examples A-D and Examples 1-4. Agitation was continued for about 15-180 seconds. A 25 ml sample of the cross-linker containing gel was placed in the cup of the FANN 50 Viscometer with an R-1, B-3 configuration and viscosity was measured at 275° F. (135° C.) and 122 rpm at 100 reciprocal seconds of shear.

Table 1 shows the performance of a 30 lb/1000 gallon (3600 g/1000 liters) CMHPG gel cross-linked with both known zirconates (Comparative Examples A-D) and those of the invention (Examples 1-4). In this Table, "% Zr" refers to percent of zirconium in the solution of the zirconium complex; "Zr, mL" refers to the milliliters of cross-linker solution injected in the test. "TEA" is triethanolamine; "QUADROL" is tetrahydroxyisopropyl ethylenediamine; "L-699" is hydroxyethyl tris-hydroxyisopropyl ethylenediamine; "THEED" is tetrahydroxyethyl ethylenediamine and "LA" is lactic acid. "Rate, min."

"Fann Time Max, min." means the time in minutes it takes to reach maximum viscosity. The viscosity at this maximum time is labeled "Cp@Max." to indicate viscosity in centipoise (Cp). The viscosity after 90 minutes at the test temperature of 275° F. (135° C.) is labeled "Cp@90 min."

TABLE

| Example No. | % Zr | Zr, mL | NPZ, moles | ZrOCl2, moles | Alkanol amine (moles) | Hydroxy alkylated diamine (moles) | Hydroxy carboxylic acid (moles) | Fann Time Max, min. | Cp @ Max | Cp @ 90 min. |
|---|---|---|---|---|---|---|---|---|---|---|
| Comp. A | 13.2 | 0.18 | 1 | | TEA (4) | | | 1.5 | 1125 | 660 |
| Comp. B | 12.4 | 0.27 | 1 | | | L-699 (1) | | 12 | 300 | 225 |
| Comp. C | 3.8 | 0.78 | | 1 | TEA (2) | | LA (3) | 6.5 | 490 | 75 |
| Comp. D | 6.8 | 0.44 | 1 | | TEA (4) | | LA (3) | 8 | 590 | 80 |
| 1 | 8.8 | 0.34 | 1 | | | QUADROL (1) | LA (3) | 5 | 1000 | 240 |
| 2 | 8.8 | 0.34 | 1 | | | QUADROL (1.5) | LA (1.5) | 6.5 | 720 | 128 |
| 3 | 8.9 | 0.34 | 1 | | | L-699 (1) | LA (3) | 5 | 565 | 110 |
| 4 | 9.0 | 0.33 | 1 | | | THEED (1) | LA (3) | 7 | 440 | 160 |

As can be seen from the Table, the zirconium-triethanolamine cross-linking composition in Comparative Example A generates excellent viscosity; however its rate of cross-linking, as measured by time to reach maximum viscosity, is much too fast at 1.5 minutes. In the field, at this rate of cross-linking, it would be expected that shear degradation and loss of viscosity of the cross-linked gel would occur, prior to reaching the zone to be fractured or plugged in the formation.

The rate of cross-linking for the hydroxyethyl tris-hydroxyisopropyl ethylenediamine-zirconium complex of Comparative Example B is very slow. In the field, viscosity generation is so slow at the slow rate of cross-linking, that sand would be expected to drop out of the cross-linking fluid before the fluid reached the zone to be fractured.

The rates of cross-linking for the triethanolamine, lactic acid zirconium complexes of Comparative Examples C and D cross-link in the desired 5-7 minute range, but they generate less than desired initial viscosity. They retain insufficient viscosity after 90 minutes to retain sand in suspension for the required length of time to complete the fracturing operation.

The cross-linking rates containing the solutions of this invention in Examples 1-4 are within the desirable range of 5-7 minutes, their initial viscosity development is excellent and the gels formed retain sufficient viscosity (greater than 100 Cp) after 90 minutes to allow completion of the fracturing operation without sand dropping out of suspension.

What is claimed is:

1. A process for preparing a solution of a zirconium complex suitable for use as a cross-linking agent in a fracturing fluid composition comprising: contacting a solution of a tetraalkyl zirconate in an alcohol with from 0.5 to 1.5 moles of a hydroxyalkylated ethylenediamine per mole of zirconium and from 1 to about 3 moles of lactic acid per mole of zirconium, wherein the alcohol has 1 to 6 carbon atoms.

2. The process of claim 1 wherein the tetraalkyl zirconate is selected from the group consisting of tetra-isopropyl zirconate, tetra-n-propyl zirconate, and tetra-n-butyl zirconate.

3. The process of claim 2 wherein the hydroxyalkylated ethylenediamine is selected from the group consisting of tetrahydroxyisopropyl ethylenediamine, hydroxyethyl tris-hydroxyisopropyl ethylenediamine, tetrahydroxyethyl ethylenediamine, and mixtures thereof.

4. The process of claim 3 wherein the hydroxyalkylated ethylenediamine is tetrahydroxyisopropyl ethylenediamine.

5. The process of claim 3 wherein the alcohol is methanol, isopropanol, or n-propanol.

6. The process of claim 5 wherein the mole ratio of hydroxyalkylated ethylenediamine to zirconium is from 1 to 1.5 and wherein the mole ratio of lactic acid to zirconium is from 1.5 to 3.

7. The process of claim 6 wherein the temperature is between 25° C. and 90° C.

8. A solution of a zirconium complex comprising the reaction product of a tetraalkyl zirconate in an alcohol, 0.5 to 1.5 moles of a hydroxyalkylated ethylenediamine per mole of zirconium, and 1 to 3 moles of lactic acid per mole of zirconium, wherein the alcohol has 1 to 6 carbon atoms.

9. The solution of claim 8 wherein the tetraalkyl zirconate is selected from the group consisting of tetra-isopropyl zirconate, tetra-n-propyl zirconate, and tetra-n-butyl zirconate; the hydroxyalkylated ethylenediamine is selected from the group consisting of tetrahydroxyisopropyl ethylenediamine, hydroxyethyl tris-hydroxyisopropyl ethylenediamine, tetrahydroxyethyl ethylenediamine, and mixtures thereof; and the alcohol is methanol, isopropanol, or n-propanol.

10. A cross-linking composition which comprises an aqueous liquid; a pH buffer; a cross-linkable organic polymer; and a solution of zirconium complex prepared by a process which comprises: contacting a solution of a tetraalkyl zirconate in an alcohol with from 0.5 to 1.5 moles of a hydroxyalkylated ethylenediamine per mole of zirconium and from 1 to about 3 moles of lactic acid per mole of zirconium, wherein the alcohol has 1 to 6 carbon atoms.

11. The composition of claim 10 wherein the aqueous liquid is selected from the group consisting of water, aqueous alcohol, and aqueous solution of a clay stabilizer.

12. The composition of claim 10 wherein the aqueous liquid is water, aqueous methanol, aqueous ethanol, an aqueous solution of potassium chloride, an aqueous solution of tetramethylammonium chloride, or a combination of two or more thereof.

13. The composition of claim 12 wherein the organic polymer is a solvatable polysaccharide and is selected from the group consisting of gums, gum derivatives and cellulose derivatives.

14. The composition of claim 13 wherein the organic polymer is hydroxyethylguar, hydroxypropylguar, carboxyethylhydroxyethyl guar, carboxymethylhydroxypropyl guar, or carboxymethyl guar.

15. A method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer, and a solution of a zirconium complex prepared by a process comprising contacting a solution of a tetraalkyl zirconate in an alcohol with from 0.5 to 1.5 moles of a hydroxyalkylated ethylenediamine per mole of zirconium and from 1 to about 3 moles of lactic acid per mole of zirconium, wherein the alcohol has 1 to 6 carbon atoms.

16. The method of claim 15 wherein the temperature in the formation is 275-325° F. (135-163° C.) and pH is 10 or greater.

17. The method of claim 15 wherein the solution of zirconium complex and the cross-linkable polymer are contacted prior to their introduction into the formation.

18. The method of claim 15 wherein a base gel is prepared by mixing the cross-linkable organic polymer with the aqueous liquid; the base gel is contacted with the solution of zirconium complex to form a cross-linked gel; the cross-linked gel is then introduced into the formation at a flow rate and pressure sufficient to create, reopen, and/or extend a fracture in the formation wherein the solution of zirconium complex, the base gel, or both further comprise a pH buffer.

19. The method of claim 15 wherein the subterranean formation is penetrated by a wellbore;
a base gel is prepared by mixing the cross-linkable organic polymer with the aqueous liquid;
the solution of zirconium complex, the base gel, or both further comprise a pH buffer;
the solution of zirconium complex is contacted with the base gel in the wellbore to produce a cross-linked gel, and the cross-linked gel is introduced into the formation from the wellbore.

20. A method for selectively plugging permeable zones and leaks in subterranean formations which comprises introducing into the permeable zone or the site of the subterranean leak, a cross-linking composition comprising an aqueous liquid; a pH buffer, a cross-linkable organic polymer; and a solution of a zirconium complex prepared by a process comprising contacting a solution of a tetraalkyl zirconate in an alcohol with from 0.5 to 1.5 moles of a hydroxyalkylated ethylenediamine per mole of zirconium and from 1 to about 3 moles of lactic acid per mole of zirconium, wherein the alcohol has 1 to 6 carbon atoms.

21. The method of claim 20 wherein the temperature in the formation is 275-325° F. (135-163° C.) and pH is 10 or greater.

22. The method of claim 20 wherein the aqueous liquid, pH buffer, cross-linkable organic polymer and the solution of zirconium complex are contacted prior to their introduction into the permeable zone or the site of the subterranean leak.

23. The method of claim 20 wherein the solution of zirconium complex and the cross-linkable organic polymer are introduced separately and sequentially into the permeable zone or the site of the subterranean leak.

24. The method of claim 20 wherein the solution of zirconium-hydroxyalkylated ethylenediamine-lactic acid complex and the cross-linkable organic polymer are introduced separately and simultaneously into the permeable zone or the site of the subterranean leak.

* * * * *